March 28, 1961 J. DE MARIA 2,977,227

METHOD FOR FABRICATING A RELIEF PRINTING PLATE

Original Filed May 3, 1954

INVENTOR.
JOHN DeMARIA
BY Kenway Jenney Witter & Hildreth
ATTORNEYS

United States Patent Office 2,977,227
Patented Mar. 28, 1961

2,977,227

METHOD FOR FABRICATING A RELIEF PRINTING PLATE

John De Maria, Rehoboth, Mass., assignor to Chemical Products Corporation, East Providence, R.I., a corporation of Rhode Island Original application May 3, 1954, Ser. No. 427,081, now Patent No. 2,875,051, dated Feb. 24, 1959. Divided and this application Feb. 18, 1959, Ser. No. 793,997

9 Claims. (Cl. 96—35)

Figure 1:
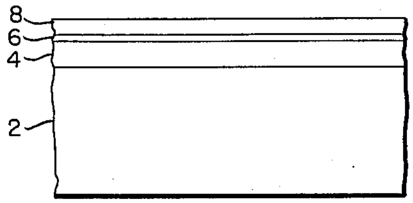

The present invention relates to relief printing plates, and more particularly to a plate on which the relief image is prepared by selective solvation of a plastisol layer or coating, and to a method of fabricating a plate having such a coating. This application is a division of copending application Serial No. 427,081, filed May 3, 1954, now Patent No. 2,875,051.

A principal object of this invention is to provide a method by which a relief image may be prepared after photographic exposure of the plate in a much shorter time than that ordinarily required in the fabrication of metal plates by photoengraving methods.

The limitations of photoengraving result from the peculiar nature of the techniques employed. For example, the time required to prepare a suitable plate, which is prohibitively long for many purposes, results largely from the etching procedure. Further, there is an inherent tendency for etching solutions to undercut the edges of the relief surfaces, thus tending to destroy definition and in some cases to render the plate either wholly unusable or at best an imperfect reproduction of the original.

Thus, it is common practice especially in preparing relief plates of line drawings, to apply to the plate after partial etching a resinous compound such as the resin extracted from certain palm fruits and generally known as "dragon's blood," the purpose being to inhibit peripheral spreading and undercutting, and to restrict further etching to the portions of each recess well within the boundaries initially defined by the acid resist.

It is therefore a further object of this invention to provide a relief plate which may be fabricated without the need for such provisions or steps to prevent the undercutting of the relief image.

Still another object is to provide a printing plate having a surface well adapted to take ink, and which is of sufficient durability to permit a large number of impressions to be taken, while yet having the desired degree of flexibility.

With the above and other objects in view, a principal feature of the invention resides in the structure of the plate and in the method of fabricating the same by disposing upon an appropriate base sheet what is termed an "impression layer" of plastisol, that is, a dispersion of a resin in a liquid plasticizer to be hereinafter more fully described, in which layer a relief image is subsequently formed by selective solvation or "fusing" of the resin in the plasticizer.

Another feature resides in the method of effecting selective solvation by infra-red radiations, including the steps of disposing an infra-red reflective layer over the unfused impression layer, selectively etching away certain portions of the reflective layer, and finally fusing the exposed portions of the layer by use of infra-red radiation.

According to another feature, the solvation of the impression layer is carried out in two steps, the first being a preliminary, uniform, partial solvation or "pre-fuse" which takes place prior to the photographic exposure of the plate and etching, and the second being the final selective fusing in the etched-away portions of the aforesaid reflective layer by infra-red radiation.

Other features of the invention reside in certain methods, steps, and procedures for fabricating relief plates, and in various features of construction of said plates which will be more fully understood with reference to the following description, and more specifically defined in the claims.

Figure 2:
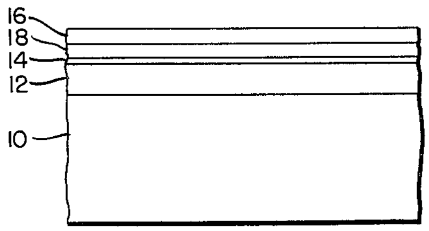

In the drawings, Fig. 1 is a fragmentary edge view showing a first form of the unprocessed plate in accordance with this invention, the various parts being represented for purposes of illustration and not necessarily to scale; and Fig. 2 is a similar view showing an alternative form of the plate.

Referring first to Fig. 1, I provide a base sheet 2 which serves as a support for the relief image, and which may be fabricated of any suitable material to which the materials hereinafter described will adhere. The properties desired of the base sheet depend largely upon the particular conditions of use, including the type of press for which it is intended (e.g., rotary or flat-bed) and the structural stresses produced in the plate under operating conditions. Thus, for a rigid plate the base 2 may be a metal sheet, properly primed with suitable adhesive. For an extremely flexible plate the base 2 may be constructed of rubber suitably primed, or a suitable elastomer or rubber substitute. A wide variety of flexible lithographic plate materials such as paper and fabric have suitable structural properties. Also, many plastic materials are suitable, such as polyvinyl sheets of the type hereinafter described. The relief image may be produced on the plate while it is supported in the flat position, if desired, and the plate can be thereafter bent over and secured to the plate cylinder of a rotary press. At the same time, the plate is preferably of sufficient strength to withstand the cyclic stresses produced during printing.

For certain types of plates, I preferably use for the base 2 a sheet of fused plastisol. For present purposes, I define "plastisol" as a dispersion of one or more resins, essentially consisting of a vinyl chloride polymer or copolymer resin of high molecular weight, in a suitable liquid plasticizer. The plasticizer at room temperature is a non-aqueous liquid that does not dissolve the resin. At an elevated temperature the resin goes into solid solution in the plasticizer, a phenomenon also termed "solvation" that is presently well understood in the art. Obviously, any equivalent composition that meets the requirements of the present process would be included in this definition.

As one example, I use a polyvinyl chloride resin sold under the trade name "Geon 121" dispersed in di 2 ethyl hexyl phthalate as the plasticiber. In its role as a base sheet material plastisol is preferred because it has the same basic components as the impression layer, hereinafter described, thus largely eliminating the problem of securing suitable adhesion of the said layer thereto.

To the base sheet I apply a so-called "impression layer" 4 of unfused plastisol of the type just described. Various procedures of application are suitable, depending somewhat upon the nature of the surface of the base sheet, such procedures including pouring, dipping, or spreading with a roller or the like. The layer is preferably equal in depth to the height of the desired relief image. Thus uniformity of thickness throughout the effective area of the plate is highly desirable. The quality of definition of the image has been found to be more satisfactory if the relief is as shallow as possible consistently with prevention of ink retention in the grooves or depressions of the plate during printing.

After application of the impression layer, the next step is preferably the controlled partial solvation of the resin in the plasticizer of the said layer by heating. This step is also referred to as "pre-fusing" or "setting up" the layer, the resulting product being a so-called "semi-gel." Upon completion of this step, the impression layer is preferably of very viscous consistency, but solvation has been arrested before the surface of the layer has attained appreciable film continuity or strength.

The foregoing step may be carried out by either of two procedures, depending upon the thickness of the impression layer and upon the general character of the image desired. According to the first alternative, fusing is carried out uniformly by immersing the plate in a controlled temperature oil bath, or by any other suitable technique by which the temperature and time of fusing can be accurately ascertained and controlled. According to the other alternative, fusing is carried out in a non-uniform fashion, whereby the portion of the impression layer adjacent the base sheet 2 is more thoroughly fused than the surface. This is preferably carried out by subjecting the plate to a source of infra-red radiation, with the face of the plate which is covered by the impression layer furthest removed from the source. Since the plastisol becomes a solid solution at a relatively moderate temperature, approximately 350° F. for the above example, a strong source of radiation is not required. Experimentation with the intensity and distance of the source, together with observation of the character of the visible surface, permits the determination of optimum conditions to produce the required gradient of fusing.

After pre-fusing, the impression layer is covered by an infra-red reflective layer 6. The main purpose of this layer is to reflect radiant heat impringing upon its surface, so as to prevent fusing of the plastisol beneath it. A variety of suitable metals may be used, and these may be formed or deposited upon the reflective layer in a variety of ways. It is desirable to employ a metal which can be easily etched; but other properties may also be important by reason of the particular procedure utilized informing the layer. Preferably, the layer is deposited by vacuum metallizing the surface of the impression layer with a suitable metal such as zinc or aluminum. While both of these metals have been found satisfactory, zinc is preferred by reason of its superior etching qualities, while aluminum is more easily metallized. A layer thus formed is extremely thin, yet has very satisfactory reflective properties. In addition to the saving in metal, the metallizing process furnishes a reflective layer having extremely good adhesion to the partially fused impression layer.

The reflective layer may also be formed in various other ways. For example, a thin foil of a suitable metal such as aluminum may be used. A suspension of metallic particles in an infra-red transparent liquid such as an aluminum paint may be brushed, spread, or sprayed upon the surface. The metal may also be electroplated upon the plastisol, in which case it is necessary to prepare the surface to render it conductive, as by coating it wtih graphite, or by dispersing suitable conductive material throughout the plastisol to render the entire layer conductive. According to still another procedure, the metal may be precipitated onto the plastisol from a solution according to a well-known process.

The next step in fabricating the plate after the reflective layer has been added is carried out under dark room conditions. A layer of photo-sensitive resist 8 is applied to the reflective surface. For this layer the same resists which are ordinarily employed in photoengraving of metal plates have been found satisfactory, but in selection care should be taken that the layer is transparent to infra-red radiation unless it is intended to remove it entirely after the etching step and before the final selective fusing. If the resist is not infra-red transparent, it is apparent that its presence during the final fusing would cause the entire impression layer to be fused.

The unexposed plate constructed according to the above process is prepared for use in a printing press by the following procedure. First, the photosensitive resist is exposed by projecting light flux through a positive transparency, or by reflecting light from a positive print, through a reversing prism as in ordinary photoengraving, after which the resist is developed in the usual manner, and washed to expose selected portions of the reflective layer to the etching compound.

Etching is carried out by a procedure generally similar to that employed in photoengraving. The reflective layer is completely removed in the unprotected areas. The etching compounds ordinarily used in photoengraving are suitable, since these are not solvents for the plastisol in the dilute concentrations required for removal of the thin layer of metal. It will be noted, of course, that the depth of the etching is extremely shallow as compared with the depth of the etching on an ordinary metal plate. Moreover, as hereinafter shown, the etching of the reflective layer plays no part whatever in determining the depth of the ultimate relief image.

The next step depends upon whether or not the resist is infra-red transparent. If it is not, it must be entirely removed at this time for the reasons previously mentioned.

Next, the plate is exposed to a source of infra-red radiation to cause further solvation of the exposed, partially fused plastisol. The plastisol beneath the remaining portions of the reflective layer is not appreciably fused by this radiation due to the reflection by the said layer of a large percentage of the impinging rays. It should be especially noted that in this step, no shrinkage occurs in the transition of the partial dispersion into a complete solid solution, since the plasticizer is not carried off as vapor, but goes into the solid phase with the originally dispersed resin fused therein. Thus, it is possible to obtain an image of high quality which is unaffected dimensionally by the final fusing.

Finally, the plate is washed in a suitable solvent for the plastisol, which removes the unfused portions of the impression layer, thus leaving the desired image in relief. Preferably, some form of agitation is employed in conjunction with the washing step. This may be accomplished by impinging a spray of solvent upon the plate, or by using a soft brush. The reflective layer and resist covering the soluble portions of the plastisol, if not separately removed after the fusion has been completed, are carried away in the washing process by mechanical action.

Washing preferably continues until the portions of the plastisol which are not fully fused are removed completely down to the base sheet. As previously mentioned, this produces a relief image equal in depth to that of the original impression layer which was deposited. If desired, the finished plate may again be subjected to heat to insure complete fusing of any remaining unfused parts thereof.

The relief plate may be secured by any suitable means in a flat bed press, or bent over the plate cylinder of a rotary press and secured thereto in much the same manner as flexible lithographic plates which are now in wide use. The flexibility of the plate depends largely upon the material employed as the base sheet, as previously mentioned. As is well known, fully fused plastisol is elastomeric in nature, and the relief surfaces therefore possess considerable resiliency, combined with adequate toughness to withstand a vary large number of printing impressions. Thus, the plate far outlasts the lithographic type of plate. Also, the fused plastisol forms a surface which will readily receive any of the ordinary printing inks.

With reference to the above-described procedure for fabricating the plates, certain additional factors should be kept in mind. For example, as is well known to those familiar with photo-engraving, an acceptable metal plate can be produced only if good adhesion is achieved between the plate and the acid resist. This requires a metal surface which is extremely clean and free of grease or oily deposits. To this end, it is common to scrub the plate with an alkaline solution prior to application of the resist. Similarly in the present method, particularly if a metal foil is used as the infra-red reflective layer, it may be desirable to scrub this layer prior to application of the resist. The metal selected may determine the method of scrubbing. Thus, while zinc can be scrubbed with some alkaline solutions, aluminum cannot. On the other hand, it has been found that if the plate is carefully protected after vacuum metallizing, scrubbing prior to application of the resist is not required.

An additional problem, which may be encountered in cases where a metal foil reflective layer is not employed, arises from the tendency of the solution used in developing the resist to pass through the reflective layer and to enter the plasticizer in the partially fused impression layer. This may adversely affect the ability of the plastisol to harden in the fusing process. If it is desired to use a developer having this tendency, the plate is preferably fabricated as shown in Fig. 2. In this case, the base sheet 10, the impression layer 12, the reflective layer 14, and the resist 16 are similar to the corresponding layers previously described with reference to Fig. 1. However, between the reflective layer 14 and the resist 16, a so-called "protective layer" 18 is added. This layer is preferably impervious to the solutions for developing and washing the resist, but soluble in the acid used in etching the reflective layer. Like the resist 16, it is desirable to have this layer transparent to infra-red radiation, for otherwise complete fusing of the plate would result from impingement of infra-red radiation thereupon. If this layer is not transparent to infra-red radiation, it will have to be removed after the reflective layer has been etched.

It will be understood that various modifications in the methods of fabrication and in the structure of the plates may be effected by the application of knowledge familiar to those skilled in the pertinent arts, without departing from the spirit or scope of the invention. A number of these modifications have been mentioned above, and others will occur as aforesaid in adapting the teachings herein to specific printing applications.

Having thus described my invention, I claim:

1. A process for making a relief printing plate, including the steps of coating a base sheet with a layer of unfused plastisol, said plastisol being a viscous dispersion of a vinyl chloride resin in a liquid plasticizer and being capable of fusing said resin in said plasticizer at elevated temperature, coating the plastisol layer with an infra-red reflective layer, coating the reflective layer with a photosensitive resist, photographing the matter to be printed upon the resist, washing the resist, etching away the portions of the reflective layer unprotected by the resist, exposing the portions of the plastisol layer unprotected by the reflective layer to an infra-red source to fuse said portions, and washing away the unfused portions of said plastisol layer.

2. A process for making a relief printing plate, including the steps of coating a base sheet with a layer of unfused plastisol, said plastisol being a viscous dispersion of a vinyl chloride resin in a liquid plasticizer and being capable of fusing said resin in said plasticizer at elevated temperature, partially fusing the plastisol by application of heat, coating the plastisol layer with an infra-red reflective layer, coating the reflective layer with a photosensitive resist, photographing the matter to be printed upon the assist, washing the resist, etching away the portions of the reflective layer unprotected by the resist, exposing the portions of the plastisol layer unprotected by the reflective layer to an infra-red source to fuse said portions, and washing away the unfused portions of said plastisol layer.

3. A process for making a relief printing plate, including the steps of coating a base sheet with a layer of unfused plastisol, said plastisol being a viscous dispersion of a vinyl chloride resin in a liquid plasticizer and being capable of fusing said resin in said plasticizer at elevated temperature, partially fusing the plastisol by application of heat upon a gradient with the portion of the layer adjacent the base sheet more fully fused than the surface thereof, coating the plastisol layer with an infra-red reflective layer, coating the reflective layer with a photosensitive resist, photographing the matter to be printed upon the resist, washing the resist, etching away the portions of the reflective layer unprotected by the resist, exposing the portions of the plastisol layer unprotected by the reflective layer to an infra-red source to fuse said portions, and washing away the unfused portions of said plastisol layer.

4. A process for making a relief printing plate, including the steps of coating a base sheet with a layer of substantially unfused plastisol, said plastisol being a dispersion of vinyl chloride resin in a liquid plasticizer, applying heat to said layer to render it viscous by partial solvation of said resin in the plasticizer, coating the plastisol layer with a metallic infra-red reflective layer, coating the reflective layer with a photosensitive material adapted for development to an acid resist after selective luminous exposure, photographing the matter to be printed upon the photosensitive material, washing said material, etching away the portions of the reflective layer unprotected by the resist, exposing the portions of the plastisol layer unprotected by the reflective layer to an infra-red source to further advance the solvation of the resin in the plasticizer, and washing away the unfused portions of said plastisol layer.

5. A process for making a relief printing plate, including the steps of coating a base sheet with a layer of substantially unfused plastisol, said plastisol being a dispersion of vinyl chloride resin in a liquid plasticizer, applying heat to said layer to render it highly viscous but without appreciable film continuity or strength by partial solvation of said resin in the plasticizer, coating the plastisol layer with a metallic infra-red reflective layer, coating the reflective layer with a photosensitive material adapted for development to an acid resist after selective luminous exposure, photographing the matter to be printed upon the photosensitive material, washing said material, etching away the portions of the reflective layer unprotected by the resist, exposing the portions of the plastisol layer unprotected by the reflective layer to an infra-red source to further advance the solvation of the resin in the plasticizer, and washing away the unfused portions of said plastisol.

6. The process according to claim 4, in which the plastisol layer is coated upon a base sheet of plastisol in which the resin has been substantially fully solvated in the plasticizer therefor.

7. The process according to claim 4, in which the step of partial solvation of the resin in the plasticizer is carried out in a controlled temperature oil bath.

8. The process according to claim 4, in which the step of partial solvation of the resin in the plasticizer is carried out non-uniformly with the portion of the plastisol layer adjacent the base sheet being more thoroughly solvated than the surface thereof.

9. The process according to claim 4, in which the step of partial solvation of the resin in the plasticizer is carried out non-uniformly with the portion of the plastisol layer adjacent the base sheet being more thoroughly solvated than the surface thereof, said step including subjecting the coated plate to a source of infra-red radiation with the face of the plate covered by said layer furthest removed from said source.

References Cited in the file of this patent

UNITED STATES PATENTS

| | | |
|---|---|---|
| 2,010,459 | Monnes et al. | Aug. 6, 1935 |
| 2,099,976 | Hogedorn | Nov. 23, 1937 |

UNITED STATES PATENT OFFICE

CERTIFICATION OF CORRECTION

Patent No. 2,977,227 March 28, 1961

John De Maria

It is hereby certified that error appears in the above numbered patent requiring correction and that the said Letters Patent should read as corrected below.

Column 5, line 66, for "assist" read -- resist --.

Signed and sealed this 29th day of August 1961.

(SEAL)
Attest:

ERNEST W. SWIDER
Attesting Officer

DAVID L. LADD
Commissioner of Patents